July 13, 1943.  W. EKERT  2,324,257
CONDENSING AND DISTILLING DEVICE
Filed July 2, 1942

INVENTOR.
WERNER EKERT
BY
his ATTORNEY

Patented July 13, 1943

2,324,257

UNITED STATES PATENT OFFICE 2,324,257

CONDENSING AND DISTILLING DEVICE

Werner Ekert, Long Island City, N. Y.

Application July 2, 1942, Serial No. 449,526

1 Claim. (Cl. 257—216)

My invention relates to devices adapted for use as reflux condensers and as distilling apparatus.

In reflux condensing of vapors, the vapors are cooled below the vaporization temperature of the desired vapor, thus condensing the desired vapors and allowing them to flow back into the vapor body, the uncondensed vapors passing outwardly from the device.

The condensing operation is effected by the absorption of heat from the vapor by the cooler condensing medium, and as the vapor and the condensing medium must be enclosed within different chambers the walls of the condensing chamber must be brought into contact with the vapors.

It is evident, therefore, that the economic effectiveness of such devices is dependent upon the area of walls of the condensing chamber in contact with the vapors, and that the greater area of such condensing chamber walls with respect to the volume of vapors in contact therewith, the more effective the condensing step within a definite period of time and with a definite quantity of condensing medium.

The object of my invention, therefore, is devices adapted for the accomplishment of the above-mentioned results, in which a maximum of condensing walls is in contact with a minimum volume of vapor to be condensed consistent with ease of operation and a minimum of time operation, and quantities of condensing medium.

In the accompanying drawing I illustrate one form of a device of my invention in which similar parts are designated by similar numerals.

Figures 1, 2:
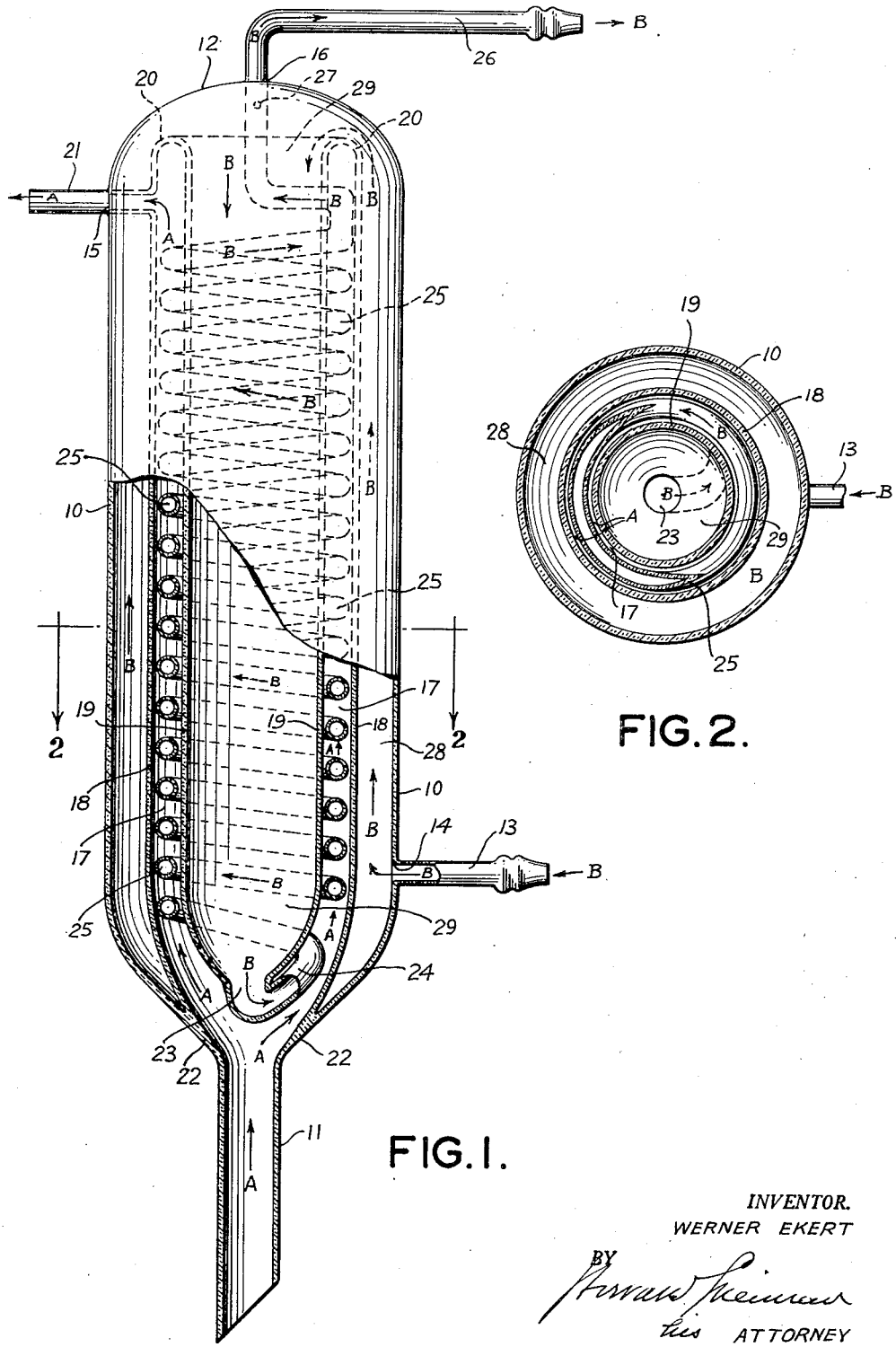
Figure 1 is a front view of one form of my device, partly broken away for purposes of clear explanation thereof.
Figure 2 is a section through the line 2—2 of Figure 1.

The particular form of the device of my invention shown in the accompanying drawing comprises an outer cylindrical casing 10, the lower portion of which is extended into the pipe 11, the upper portion of this outside cylinder casing forming the top 12. A pipe 13 opens into the lower portion of the cylindrical casing 10 through an opening 14 therein and the upper portion of this outer cylindrical casing has two openings 15 and 16.

Positioned within the outer cylindrical casing 10 and spaced from the sides thereof is a chamber 17 formed by the walls 18 and 19. The upper extremities of the walls 18 and 19 form a U-shaped top member 20. A pipe 21 passes through the opening 15 of the wall 10 of the outer cylindrical casing and connects with the chamber 17. The lower portion of the wall 18 is hermetically sealed to the lower portion of the wall 10 at 22. The lower portion of the wall 19 of the chamber 17 is extended inwardly forming a well 23.

The lower open extremity 24 of a coiled pipe 25 is positioned within the well 23. This coiled pipe 25 is positioned within the chamber 17 and extends upwardly and outwardly through the opening 16 of the outer cylindrical casing 10 forming the pipe 26.

A small opening 27 is within the upper portion of the coiled pipe 25, to allow of the escape of air during the first introduction of a condensing medium.

The operation of the device is as follows:

The vapors to be condensed are introduced through the pipe 11 and pass upwardly through the chamber 17, any uncondensed vapors passing outwardly through the pipe 21 as indicated by the arrows marked A.

The condensing medium, as water, is introduced through the pipe 13 and passes upwardly through the chamber 28 formed by the walls 10 and 18, thence downwardly through the chamber 29, formed by the wall 19, thence upwardly through the coiled pipe 25 and outwardly through the pipe 26 as indicated by the arrows marked B.

It will be noted that during the entire movement of the vapors within the chamber 17 they are continually subjected to the triple condensing effect of the wall 18, the wall 19 and the coiled pipe 25; and, that the contents of the chamber 17 is very small compared with the area of the cooling medium, thus producing a maximum of condensation of the vapor during its passage through the chamber 17, and especially in the lower portion thereof, thus greatly increasing the condensing effect of the condensing material and thus reducing the amount necessary to condense the vapors.

In the operation above described the device acts as a reflux condenser.

If, however, liquids to be distilled are introduced through the pipe 13 and liquids or vapors heated above the vaporization point of the introduced material to be distilled are introduced through the pipe 21, the distillable products from the introduced material to be distilled will pass through the chamber 28, the chamber 29, the coiled pipe 25 outwardly through the pipe 26 during which passage it will be subjected to the distilling temperature of the wall 18, the wall 19 and the walls of the coiled pipe 25.

In this last described operation the device acts as a distilling apparatus.

The device may also be employed as a distilling apparatus by introducing the material to be distilled through the pipe 11 and the heated medium, through the pipe 13, in which event the distillable material will be subjected to the triple-fold heating effect and pass out through the pipe 21.

Further if the vertical position of the device, as shown, be reversed and vapors be introduced through the pipe 21 and condensing mediums be introduced through the pipe 26, the device will operate as a reflux condenser, and that if distillable material be introduced through the pipe 26 and properly heated material be introduced through the pipe 21, it will act as a distilling apparatus, and in each case the material treated will be subjected to a three-fold operative step of effectiveness.

It will be particularly noted that the vapors to be condensed in the chamber 17 are in contact with the greatest possible wall area of the condensing conduits, and, further, that the coiled pipe 25 acts as a baffle to prevent the too rapid flow of the vapor through the chamber 17, thus maintaining it in contact with the cooling walls for a maximum of heat absorption from the vapors with a minimum of condensing medium.

My device may be made of glass or other suitable material for laboratory operations, or may be constructed for factory employment.

I do not limit myself to the particular size, shape, number, arrangement or material specifically shown and described as these are given solely for the purpose of clearly describing the devices of my invention.

What I claim is:

A condensing and distilling device comprising an outer casing closed at the top, said casing having an opening in the upper portion of the side thereof, an opening in the top portion thereof and an opening in the bottom portion thereof, the lower portion of said casing being extended downwardly into a restricted portion having an opening therein; an annular intermediate chamber within said casing closed at the upper portion and open at the bottom portion within said casing and spaced from the sides thereof, the lower portion of the outer wall of which is integral with the lower portion of said casing forming an outer chamber therewith, the inner wall of said intermediate chamber forming an inner chamber open at the top thereof, the bottom portion of said inner chamber having an opening connecting it with the interior of said intermediate chamber; a pipe extending from the upper portion of said intermediate chamber outwardly of said casing through said upper opening therein and a coiled pipe within said intermediate chamber opening into the bottom portion of said inner chamber and extending upwardly through said intermediate chamber and outwardly through said opening in the top member of said casing; said device being adapted to allow of the passage of a fluid through the restricted end of said casing, thence through said intermediate chamber and thence outwardly through the opening in the upper side portion of said casing; said device being further adapted to allow of the simultaneous passage of a fluid through said opening in the lower portion of said casing into said outer chamber, thence downwardly through said inner chamber, thence upwardly through said coiled pipe and outwardly through the opening in the top member of said casing.

WERNER EKERT.